Dec. 22, 1953 L. H. SCOTT 2,663,397
CENTRIFUGAL AND ONE-WAY CLUTCH
Filed Sept. 24, 1949 2 Sheets-Sheet 1
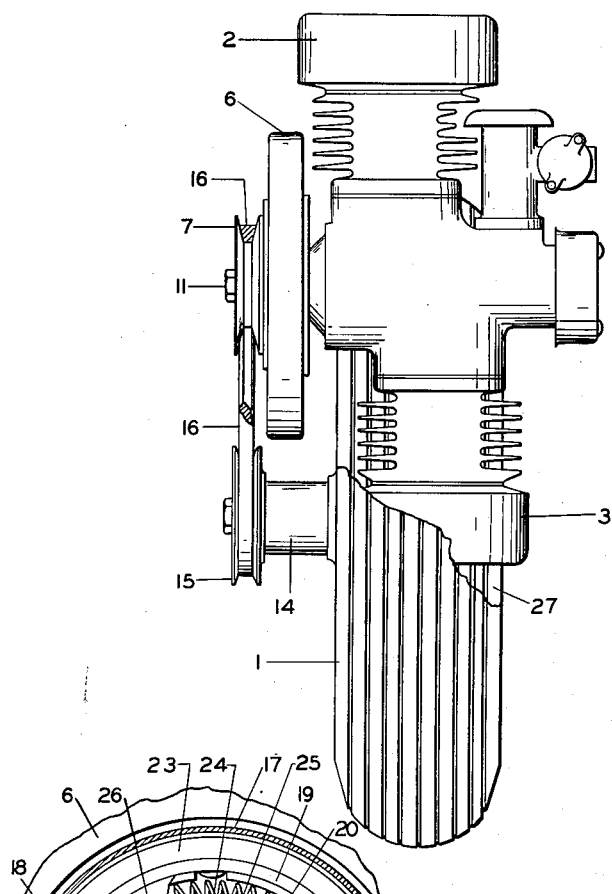
*Fig_1_*
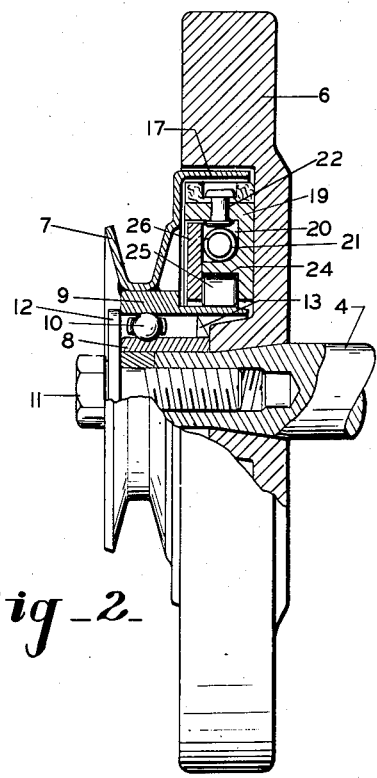
*Fig_2_*
*Fig_6_*
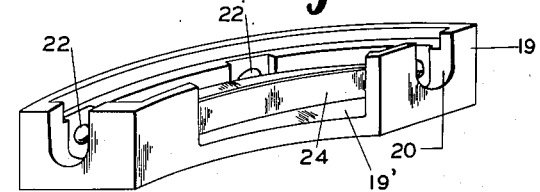
*Fig_3_*
INVENTOR.
LLOYD H. SCOTT
BY
Frank H. Harmon
ATTORNEY Dec. 22, 1953  L. H. SCOTT  2,663,397
CENTRIFUGAL AND ONE-WAY CLUTCH
Filed Sept. 24, 1949  2 Sheets-Sheet 2
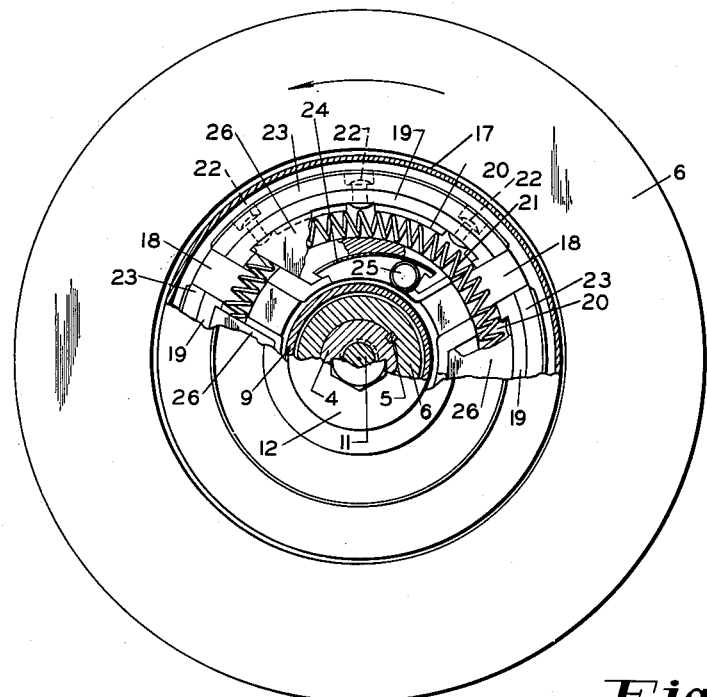
Fig-4-
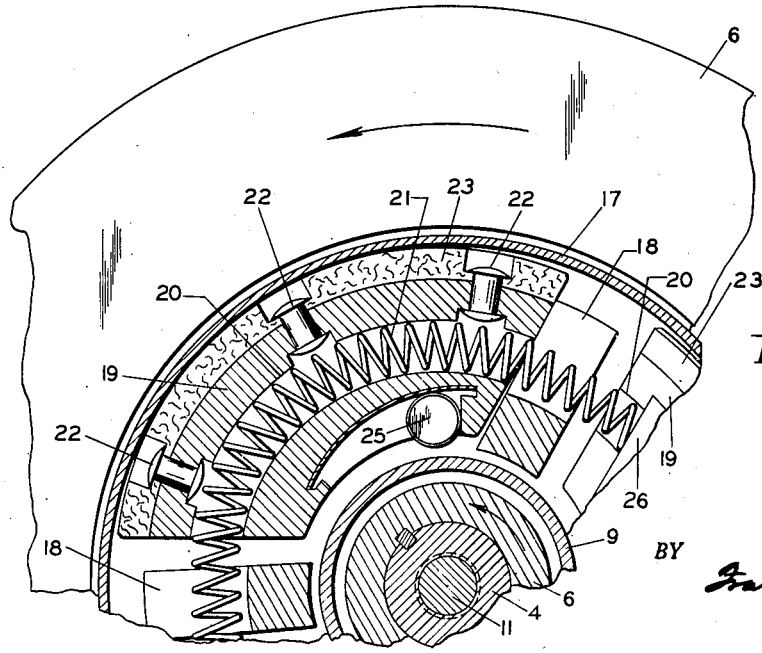
Fig-5-
INVENTOR.
LLOYD H. SCOTT
BY
Frank H. Harmon
ATTORNEY

UNITED STATES PATENT OFFICE 2,663,397

CENTRIFUGAL AND ONE-WAY CLUTCH

Lloyd H. Scott, Chagrin Falls, Ohio, assignor to Jack & Heintz Precision Industries, Inc., Cleveland, Ohio, a corporation of Delaware Application September 24, 1949, Serial No. 117,531

4 Claims. (Cl. 192—105)

This invention relates in general to clutches and more particularly to automatically operated clutches.

The invention had its inception in my desire to design a simple and efficient automatic clutch for use particularly in engine driven bicycles, and the like. My specific object is to provide in the transmission train between the engine and the vehicle driving road wheel, a single clutch that will enable cranking and starting of the engine by foot pedalling of the engine driven bicycle in the same manner as pedalling a bicycle, or other drive of the driving road wheel; the subsequent idling of the engine without driving the bicycle and the actual engine driving of the bicycle upon higher engine speeds under throttle control.

In my development of a clutch for such a particular adaptation, one of the primary broader objects of my invention is to provide, in the transmission train between the power plant and a motor vehicle driving wheel, a single automatically operated clutch that will be normally disengaged and which is provided with two independent means for automatically effecting its engagement under different conditions.

Other object is to provide such a single clutch unit with centrifugal members that rotate with the power driven member to disengage the clutch at engine idling speed and automatically engage the clutch at higher engine speeds under throttle control.

A further object is to provide such a single clutch with centrifugal members that rotate with an engine driven member and spring means acting on the centrifugal members to normally disengage the clutch at engine idling speeds, the centrifugal members at higher engine speeds being adapted to automatically engage the clutch and an additional manually operable cranking means whereby, and independently of engine operation, the clutch may be engaged for engine cranking automatically.

A further object is to provide such a single clutch with means whereby the clutch will be automatically disengaged after engine cranking as soon as the engine starts.

A further object is to provide such a single clutch with means whereby the engine may be cranked either by foot pedalling, or by pushing, towing or coasting of the vehicle and its driving road wheel.

A further object is to provide such a single clutch with two independent means operating under different conditions for effecting smooth clutch engagement and disengagement not obtainable by the use of ratchets, gears or overriding clutches in parallel with a main clutch.

With the foregoing and other objects in view, the invention resides in the combination of parts and in the details of construction hereinafter set forth in the following specification and appended claims, certain embodiments thereof being illustrated in the accompanying drawings, in which:

Figure 1 is a view in rear elevation of a vehicle driving road wheel, an engine, a flywheel in which the single automatically operated clutch is housed, an engine driven pulley and a continuous belt connecting the same to a pulley to drive the vehicle driving road wheel;

Figure 2 is a view in rear elevation of the engine flywheel, partly in section to show the engine shaft, the clutch and pulley;

Figure 3 is a view in perspective of one of the clutch centrifugal members without the spring or rollers;

Figure 4 is a view in side elevation of the flywheel, partly in section to show the single clutch disengaged at idling engine speed, due to the restraining force of the spring on the centrifugal members to resiliently urge them radially inwardly;

Figure 5 is a similar view but fragmentary, showing the centrifugal members thrown radially outwardly at higher engine speed against the spring action to engage the clutch as the flywheel rotates counterclockwise as shown by the arrow; and Figure 6 is a similar fragmentary view showing the clutch being engaged by means, independently of engine operation, and by drive of the vehicle road wheel driving member to effect a drive by the latter of the engine flywheel.

Referring more particularly to the drawings, one of the uses to which my single automatically operated clutch is adapted, is that of an engine driven bicycle, the driving road wheel of which is shown at 1. An internal combustion engine is shown as having two cylinders 2 and 3 to drive a crankshaft 4. The crankshaft 4 is keyed at 5 to a flywheel 6 to drive the latter.

The crankshaft 4 has mounted thereon a belt pulley 7 that is free to rotate on the crankshaft. The assembly for accomplishing this includes a bushing 8 carried by the crankshaft to form an inner race and a bushing 9 carried by the pulley 7 to form an outer race for a series of ball bearings 10. Bushing 9 is formed to also act as an inner race for rollers 25. A bolt 11 is screwed into the outer end of the crankshaft to bear inwardly on a cover plate 12 to retain pulley 7 and the bearing in place on the crankshaft. A suitable grease shield is shown at 13. The vehicle driving road wheel has a driving axle 14 which carries a pulley 15 to be engaged by a continuous V-belt 16 that also engages pulley 7.

As stated before, my simplified single automatically operated clutch is housed in the flywheel which has its central outer portion recessed to receive it. Also, the pulley 7 has a circular flange 17 that extends into the flywheel recess with clearance between the flange and the flywheel.

One of my stated objects is to provide opposing centrifugal and resilient means for normally disengaging the single clutch at engine idling speeds and for automatically engaging the clutch at higher engine speeds. As a means for accomplishing this, I have shown the flywheel to contain in its recess three rigid partition members, or webs, 18 extending axially of the crankshaft. In between these three webs are loosely fitted three centrifugal segmental members 19.

Each of these centrifugal members 19 has an axially outer open groove 20 to receive an endless circular tension coil spring, or garter spring, 21. Each of the webs 18 is similarly grooved so that when the garter spring is assembled it embraces all three webs and all three centrifugal members to compress the latter radially inwardly. Each of the three centrifugal members 19 also has secured by rivets 22 to its outer arcuate surface a friction clutch lining 23.

Each of the three segmental centrifugal members 19 has its inner face formed with a recess 19' having an inclined radially arcuate ramp whose surface is preferably provided with a hard wear resisting metal liner 24. Each recess and ramp accommodates a hard metal roller 25. Plate 26 is a cover to retain the garter spring and rollers.

Figure 4 shows the clutch unit when the engine is either not running, or is running at idling engine speed, with the flywheel being driven in a counterclockwise direction, as shown by the arrow. By reason of the rigid webs 18, the clutch liners, the centrifugal segments 19, garter spring 21 and rollers 25 are rotated in a corresponding counterclockwise direction. The force of the garter spring is, however, sufficient at engine idling speeds to hold the centrifugal segments 19 inwardly against the rigid webs 18, so as to leave clearance between the friction clutch liners 23 and the inner surface of the pulley clutch drum 17. Hence, the rotation of the clutch shoes, which are not in engagement with the clutch drum 17, can impart no rotational drive to pulley 7 and there is consequently no drive to the vehicle driving road wheel. Wheel 27 may be the steering front wheel.

When, however, the engine throttle is advanced to give greater engine speed, the centrifugal force exerted on segments 19 causes them to move radially outwardly, overcoming the restraining force of the garter spring and bringing friction liners 23 into frictional driving engagement with clutch drum 17 of pulley 7, as shown in Figure 5. The rollers 25 are then carried in the larger right hand sides of the pockets afforded by the segment inner recesses and out of engagement with the inner roller race 9. As long as this engine speed, above a predetermined idling speed, continues, pulley 7 is being driven, and through V-belt 16 and pulley 15, the vehicle road wheel is driven at a corresponding speed.

One of my other stated objects is to provide inherently in such a simple single automatic clutch unit, means whereby the engine may be cranked merely by driving pulley 7 in the proper direction, here shown as counterclockwise. In the case of an engine driven bicycle a simple pedal operation not only imparts a drive to the axle and road wheel but also through pulley 15 and V-belt 16 imparts a rotational drive to pulley 7 in a counterclockwise direction, as viewed in Figures 4 and 5. As previously described, bushing 9 is rigid with pulley 7 and acts as an outer race for ball bearings 10 and an inner race for rollers bearings 25. Thus, during the cranking operation, with the engine and flywheel at rest, a rotation of bushing 9 in a counterclockwise direction also carries the rollers 25 in a counterclockwise direction, as shown in Figure 6. This action causes the roller 25 to become wedged into the smaller portion of the segment recess in frictional engagement both with the inclined ramp liner 24 and the bushing 9. This wedging action forces the segment 19 radially outward against the restraining action of the garter spring 21 forcing the frictional clutch lining 23 into frictional engagement with the clutch drum 17. Thus a clutch drive is established between the pulley 7 whenever it is driven clockwise through the flywheel to the engine crankshaft. When the engine starts, the frictional engagement of the clutch for cranking is automatically discontinued since the engine tends to drive the pulley faster than it is being driven by cranking action. This causes the rollers to roll back to the wide end of the segment recess removing the wedging action which forced the clutch into engagement for cranking purposes.

From the foregoing it will be seen that I have provided a single automatically operated clutch in the transmission between a power plant and a driven wheel of a motor vehicle. The clutch is simple and effective and may be incorporated in an engine flywheel. The clutch is normally disengaged and is provided with two independent means for effecting its engagement. It may be engaged by the operation of centrifugal elements which rotate at all times with the engine driven member, such as an engine flywheel. The engagement of the clutch depends automatically upon engine speed so that the clutch is normally disengaged while the engine is either at rest or idling and the clutch is automatically engaged to drive the vehicle as the engine speed is increased by throttle control. The same single clutch is automatically engaged for engine cranking whenever the vehicle or driving road wheel is driven forward by means other than the engine, such as by pushing, towing or coasting or foot pedalling in the case of a motor bike. It is inherent, in my improved automatically controlled clutch, that during the engine cranking operation, smooth engagement of the clutch is assured, which is not obtainable by ratchets or overriding clutches in parallel with a main clutch. The transmission of torque through the transmission mechanism is in the opposite direction to that normally transmitted while the engine is driving the vehicle. This reversal of torque is employed to operate the other essential part of the clutch engaging mechanism. When the engine starts, the torque is then reversed to the normal driving condition which automatically disengages the mechanism used for cranking engagement of the clutch. It is to be understood that my invention in automatically operated clutches has a wide variety of applications other than for engines and motor vehicles, such as bicycles, and, of course, it shall not be construed as being limited thereto.

I claim:

1. A clutch for use between a power source and a driving member for driving a driven member, said clutch having power source driven centrifugal segments normally spring pressed radially inwardly, said segments having outer frictional driving surfaces and being adapted, in response to a predetermined power source speed, to automatically engage said clutch by engaging said segment friction driving surfaces with said driving member and to be automatically spring retracted out of such frictional engagement at lesser power source speeds to disengage said clutch, independent means, operable by drive of said driving member and independently of power source operation, for engaging said clutch for cranking said power source, said independent means comprising rollers normally loosely engaging the outer surface of a bushing rigid with said driving member, said rollers being carried in recesses provided in the inner faces of said segments, said recesses having ramps inclined radially inwardly with respect to the direction of rotation of said segments, whereby rotation of said driving member in that direction, independently of power source operation, wedges said rollers in said recesses to engage said clutch by frictionally engaging said segments with said driving member.

2. A clutch for use between a power source and a driving member for driving a driven member, said clutch having engine driven centrifugal segments normally spring pressed radially inwardly, said segments having outer frictional driving surfaces and being adapted, in response to a predetermined speed of rotation of said power source, to automatically engage said clutch by engaging said segment friction driving surfaces with said driving member and to be automatically spring retracted out of such frictional engagement at lesser speeds of rotation of said power source to disengage said clutch, independent means, operable by drive of said driving member and independently of power source operation, for engaging said clutch for cranking said power source and for automatically disengaging said clutch upon starting of said power source, said independent means comprising rollers carried in recesses provided in the inner faces of said segments, said recesses having ramps inclined radially inwardly with respect to the direction of rotation of said segments, whereby rotation of said driving member in one direction, independently of power source operation, wedges said rollers in said recesses to frictionally engage said segments with said driving member and starting of said power source releases said rollers out of such wedged engagement.

3. A clutch for use between a power source and a driving member for driving a driven member, said clutch comprising a clutch drum carried by said driving member and a plurality of power source driven centrifugal segments and a spring for pressing the segments radially inwardly, said segments having outer frictional clutch surfaces, said segments being adapted, in response to a predetermined power source speed of operation of said power source, to automatically engage said clutch by engaging their frictional clutch surfaces with said clutch drum and to be automatically spring retracted out of such frictional engagement at lesser power source speeds to disengage said clutch, independent means operable by drive of said driving member and independently of power source operation, for engaging said clutch for cranking said power source and for automatically disengaging said clutch upon starting of said power source, a bushing rigid with said road wheel driving member and rotatable on the driving shaft of said power source, said independent engine cranking means comprising rollers carried in recesses provided in the inner faces of said segments, said recesses having ramps inclined radially inwardly with respect to the direction of rotation of said segments, whereby rotation of said driving member in one direction, independently of power source operation, wedges said rollers in said recesses against said bushing and expands said segments, against the action of said spring, to engage the segment clutch surfaces with said clutch drum, and whereby starting of the power source releases said rollers out of such wedged engagement.

4. A clutch for use between a power source, including a crankshaft having a flywheel, and a driving member for driving a driven member, said clutch being housed in the flywheel of said power source and comprising a clutch drum carried by said driving member and a plurality of power source driven centrifugal segments and a spring for pressing the segments radially inwardly, said segments having outer frictional clutch surfaces, said segments being adapted, in response to a predetermined speed of power source operation, to automatically engage said clutch by engaging their frictional clutch surfaces with said clutch drum and to be automatically spring retracted out of such frictional engagement at lesser power source speeds to disengage said clutch, independent means operable by drive of said road wheel driving member and independently of power source operation, for engaging said clutch for cranking said engine and for automatically disengaging said clutch upon starting of said power source, a bushing rigid with said road wheel driving member and rotatable on the crankshaft of said power source, said independent power source cranking means comprising rollers carried in recesses provided in the inner faces of said segments, said recesses having ramps inclined radially inwardly with respect to the direction of rotation of said segments, whereby rotation of said road wheel driving member in that direction, independently of power source operation, wedges said rollers in said recesses against said bushing and expands said segments, against the action of said spring, to engage the segment clutch surfaces with said clutch drum, and whereby starting of the power source releases said rollers out of such wedged engagement.

LLOYD H. SCOTT.

References Cited in the file of this patent

UNITED STATES PATENTS

| Number | Name | Date |
|---|---|---|
| 1,910,141 | Wemp | May 23, 1933 |
| 2,168,856 | Banker | Aug. 8, 1939 |
| 2,230,293 | Harris | Feb. 4, 1941 |
| 2,275,046 | Harris | Mar. 3, 1942 |
| 2,286,461 | Burns | June 16, 1942 |
| 2,309,597 | Kacic | Jan. 26, 1943 |
| 2,333,680 | Schneider et al. | Nov. 9, 1943 |
| 2,529,919 | Cunningham | Nov. 14, 1950 |
| 2,572,528 | Selander | Oct. 23, 1951 |